United States Patent

Tung et al.

[11] Patent Number: 5,756,173
[45] Date of Patent: May 26, 1998

[54] FILM FACESTOCK AND DISPLAY PRODUCTS

[75] Inventors: Harvey C. Tung, Newark; Steve Skapik, Granville, both of Ohio

[73] Assignee: The Dow Chemical Company, Midland, Mich.

[21] Appl. No.: 712,817

[22] Filed: Sep. 12, 1996

Related U.S. Application Data

[60] Provisional application No. 60/003,740 Sep. 14, 1995.
[51] Int. Cl.$^6$ ........................................................ B32B 7/00
[52] U.S. Cl. ........................ 428/40.1; 283/81; 428/41.3; 428/41.5; 428/41.6; 428/323; 525/240
[58] Field of Search .............................. 428/40.1, 41.6, 428/41.3, 41.5, 323; 525/240; 283/81

[56] References Cited

U.S. PATENT DOCUMENTS

| Re. 32,929 | 5/1989 | Ewing | 428/220 |
|---|---|---|---|
| 3,502,757 | 3/1970 | Spencer | 264/89 |
| 3,530,964 | 9/1970 | Metz, Jr. | 264/90 |
| 4,188,432 | 2/1980 | Holden | 428/35 |
| 4,713,273 | 12/1987 | Freedman | 428/40 |
| 4,888,075 | 12/1989 | Freedman | 156/243 |
| 4,946,532 | 8/1990 | Freedman | 156/243 |
| 5,151,309 | 9/1992 | Dollinger | 428/40 |
| 5,238,630 | 8/1993 | Tung | 264/132 |
| 5,242,650 | 9/1993 | Rackovan et al. | 264/509 |

FOREIGN PATENT DOCUMENTS

0 060 525 A2   9/1982   European Pat. Off.

OTHER PUBLICATIONS

Kraton Thermoplastic Rubber Brochure, Typical Properties 1992, Shell Chemical Company.
Kraton Thermoplastic Rubber, Brochure, Oct. 1993, Shell Chemical Company.
Kraton Polymers For Modification of Thermoplastics, Brochure, Shell Chemical Company.
Kraton Polymers for Adhesives and Sealants Brochure, Oct. 1992, Shell Chemical Company.
Kraton Processing and Fabricating Kraton Thermoplastic Rubber Compounds, Brochure, May 1994, Shell Chemical Company.
Kraton Polymer for Adhesives and Sealants, Brochure, Shell Chemical Company.

*Primary Examiner*—Nasser Ahmad
*Attorney, Agent, or Firm*—Stanley K. Hill

[57] ABSTRACT

A deformable label comprising a printable film facestock having at least one layer containing incompatible polymers. The printable film facestock exhibits significantly reduced die-face buildup during extrusion of the printable film facestock when compared to the die-face buildup exhibited by film facestock of the prior art. The present invention provides for monolayer film facestock containing incompatible polymers and colorants. The present invention also allows printable film facestock to be produced in a more cost-effective manner.

8 Claims, No Drawings

FILM FACESTOCK AND DISPLAY PRODUCTS

This application claims the benefit of U.S. Provisional Application No. 06/003,740, Filed Sep. 14, 1995 now application Ser. No. 08/712,817, filed Sep. 12, 1996.

BACKGROUND AND SUMMARY OF THE INVENTION

This invention generally relates to thermoplastic film facestock useful for making display products such as labels. More specifically, this invention relates to thermoplastic film facestock containing compatibilizers that reduce die-face buildup during extrusion of films comprising incompatible polymers.

It is well known in the art to use thermoplastic film facestock for making labels that are preferable in many respects to paper labels. For making labels, film facestock is generally used in conjunction with an adhesive layer. These thermoplastic film facestocks include calendered plasticized vinyl (i.e., PVC) and biaxially oriented polyester.

More recently, U.S. Patent No. 5,151,309 issued to Dollinger ("Dollinger") (incorporated herein by reference) teaches a film facestock comprising a compatibilized blend of styrenic and ethylenic materials and labels made therefrom. Labels made from the film facestock taught in Dollinger demonstrate adequate resistance to cracking, tearing, creasing, wrinkling, and shrinking upon deformation of a substrate to which the label is joined; printability; chemical and dimensional stability of previously known polyethylene labels; and the desirable die-cuttability and dispensability properties of vinyl films.

Although the teachings of Dollinger have proven useful in making improved film facestock and labels, there have been some deficiencies in using compatibilized blends of polymers that are generally considered incompatible (e.g., polystyrene and polyethylene). One significant problem is die-face buildup. When extruding compatibilized blends of incompatible polymers to make film facestock, material tends to accumulate on the die surfaces. This accumulation of material (i.e., die-face buildup) creates defects in the resulting film. Additionally, clearing off or cleaning up the die-face buildup results in process down time.

The addition of colorants or pigments, such as titanium dioxide ("$TiO_2$") into the compatibilized blends exacerbates the die-face buildup problem. In fact, as is taught in Dollinger (especially at column 5, lines 33-45 and column 6, lines 57-65), it has been found that $TiO_2$ tends to build up on a die lip over time where it is not isolated in an inner layer of the film, and eventually breaks off into the film. Accordingly, when incorporating $TiO_2$ into the facestock, it is preferred to make multilayer film facestock with the outer or skin layers containing very little or no $TiO_2$.

Although a multilayer film facestock having no $TiO_2$ in the outer or skin layers may reduce the die-face buildup problem, multilayer film facestock is generally more difficult and more expensive to manufacture than a monolayer film. Manufacturing a multilayer film requires more equipment (i.e., a feedblock or multimanifold die and multiple extruders) than is needed to manufacture a monolayer film.

Manufacturing a multilayer film containing $TiO_2$ requires control of the $TiO_2$ content, the different layer thicknesses, and the total film thickness to obtain a film of uniform opacity. Also, the output of multiple extruders must be adjusted to meet given layer thickness ratios.

When making a monolayer film, only the $TiO_2$ level and the total film thickness need to be controlled. Thus, with a monolayer film there are fewer variables to control and no output restrictions from layer thickness requirements. Accordingly, a more consistent film can be produced at higher rates.

It is an object of the present invention to reduce the amount of die-face buildup created during production of film facestock containing incompatible polymers. It is also an object of the present invention to provide a composition containing incompatible polymers that is more economical to make into film facestock than existing compositions containing incompatible polymers. It is another object of the present invention to provide monolayer film facestock comprising incompatible polymers and colorants, such as $TiO_2$. It is still another object of the present invention to provide multilayer film facestock comprising incompatible polymers and/or colorants, such as $TiO_2$, in one or more of the outer or skin layers that are more economical to manufacture than existing film facestock. Other objectives of the present invention may become apparent upon reading this specification.

SUMMARY OF THE INVENTION

The present invention provides a film facestock which meets one or more of these objectives. In one aspect, the present invention provides an improved film facestock formulation that facilitates a more economical production of film labelstock than previously used formulations. Die-face buildup is significantly reduced during production of film facestocks made from formulations of the present invention, reducing process down time and improving quality by reducing surface defects.

Formulations of the present invention generally comprise a blend of at least two incompatible polymers and a styrene-ethylene/butylene-styrene block copolymer ("SEBS"). Blends of the present invention may contain other materials (e.g., UV stabilizers, pigments, fillers, other stabilizers, etc.), so long as these other materials in the amounts contemplated do not unduly interfere with desirable properties (e.g., deformability, die-cuttability, dispensability) of the products (e.g., facestock, labels) incorporating the blends. The amount of SEBS needed in blends of the present invention is significantly less than the amount of compatibilizer needed in blends typically used in the current art.

In another aspect, the present invention is a printable film facestock made from blends of the present invention, which has utility for label applications. The film facestock may be monolayer or multilayer. Preferably, film facestock of the present invention is monolayer. Because of the reduced die-face buildup during production of film facestock of the present invention, colorants or pigments, such as $TiO_2$, can be utilized in a monolayer facestock or in any layer of a multilayer facestock, including an outer or skin layer.

In yet another aspect, the present invention is a label suitable for attachment to a selected deformable substrate. Labels of the present invention comprise a printable film facestock of the present invention together with an adhesive for affixing the film to the substrate. The adhesive can be coextruded with the film facestock or applied using other techniques well known in the art, such as extrusion coating.

DETAILED DESCRIPTION OF THE PREFERRED EMBODIMENTS

Generally, blends of the present invention contain at least two incompatible polymers. Preferably, blends of the present invention contain a polyolefin polymer and a polystyrene polymer. Preferably, the polystyrene polymer is selected from the group consisting of high impact polystyrene, general purpose polystyrene, rubber-modified polystyrene, and mixtures thereof. Preferably, the polyolefin polymer is selected from the group consisting of linear low density polyethylene ("LLDPE"), ultra low density polyethylen ("ULDPE"), low density polyethylene ("LDPE"), medium density polyethylene ("MDPE"), copolymers of ethylene and propylene, copolymers of ethylene and acrylate monomers, copolymers of ethylene and vinyl acetate ("EVA"), copolymers of ethylene and acrylic acid ("EAA"), and mixtures thereof. More preferably, blends of the present invention contain a polyethylene and a polystyrene.

Blends of the present invention contain a material to compatibilize the incompatible polymers. In general, compatibilizers that are more thermally stable are preferred over compatibilizers that are less thermally stable. Also, compatibilizers having lower viscosity are preferred over compatibilizers having higher viscosity. Preferably, the compatibilizer is a styrene-ethylene/butylene-styrene block copolymer ("SEBS"). More preferably, the compatibilizer is a blend of SEBS triblock and SEBS diblock. Most preferably, the compatibilizer is a blend of SEBS triblock and SEBS diblock containing predominately SEBS triblock. Examples of such compatibilizers are KRATON G1657X and KRATON G1726X (available from the Shell Chemical Company).

Generally, from about 1 weight percent to about 5 weight percent of the compatibilizer is needed in blends of the present invention to minimize die-face buildup. Preferably, from about 1.5 to about 4 weight percent of the compatibilizer is used. However, these amounts may vary slightly depending on the compatibilizer used and the temperature of the die used to extrude blends of the present invention.

Blends of the present invention may contain other materials in addition to the incompatible polymers and the compatibilizer so long as these other materials in the amounts contemplated do not unduly interfere with achieving the desired characteristics sought to be achieved. For example, one such material is $TiO_2$, a conventional filler and pigment desirable for printing or graphic reproduction purposes.

When $TiO_2$ is present, it generally comprises at least about 1 weight percent, and preferabley, at least about 3 weight percent of blends of the present invention. $TiO_2$ generally comprises no more than about 12 weight percent, and preferably, no more than 9 weight percent of the blend.

Blends of the present invention may be made into monolayer or multilayer films (i.e., film facestock) using techniques well known in the art. When made into multilayer films, blends of the present invention can comprise any of the layers of the multilayer film, including the outer or surface layers. In fact, it is an important benefit of the present invention that blends of the present invention containing $TiO_2$ can be extruded as a surface layer in an extruded film while exhibiting minimal die-face buildup. The phrase surface layer is meant to include the outer or skin layer(s) in a multilayer film as well as the only layer in a monolayer film.

Film facestock of the present invention can be incorporated into a flexible label suitable for attachment to a selected deformable substrate. Generally, film facestock of the present invention is coated using techniques known in the art with an adhesive suitable for forming a sufficient bond between the film facestock and the selected deformable substrate. The types of adhesives used are known in the art. As is known in the art, a release liner is typically adhered to the adhesive layer until and peeled away prior to attaching the label to the selected substrate.

EXAMPLES

In order to test the effect various compatibilizers have on the amount of die-face buildup, a number of polymer blends were created and extruded using a 2 inch, 20:1, TEC extruder with a 0.125inch strand die attached to the end of an approximately 3 foot transfer line. Die-face buildup was measured as the blends were extruded through the die by scraping off and weighing the buildup and dividing the buildup weight by the amount of polymer blend that was extruded to produce the buildup. Die-face buildup was measured using die temperatures of 360° F. and 450° F. The results of the die-face buildup measurements are shown in Table I.

All the blends shown in Table I contained 30 weight percent polystyrene (STYRON 478, available from The Dow Chemical Co.). Those blends containing $TiO_2$ also contained an equal amount of a low density polyethylene ("LDPE") carrier material. Thus, if a blend contained 7% by weight of $TiO_2$, then the blend also contained 7% by weight the LDPE carrier material. The remainder of each blend constituted a compatibilizer and a different LDPE (melt index=1.5, density=0.922 g/cc). Accordingly, specifying the weight percent and type of compatibilzer and the weight percent of $TiO_2$ in each blend determines the precise composition of each blend shown in Table I.

TABLE I

| Compatibilizer | | $TiO_2$ | Die-face Buildup (mg/100 lb extrudate) | |
|---|---|---|---|---|
| | | | 360° F. | 450° F. |
| Type | Wt. % | Wt. % | Die temp | Die temp |
| None | 0.0 | 0 | 237 | — |
| SB[1] | 2.5 | 0 | 380 | — |
| | 5.0 | 0 | 175 | |
| | 7.5 | 0 | 70 | — |
| | 10.0 | 0 | 54[6] | 100 |
| | 10.0 | 7 | 75 | 180 |
| | 20.0 | 0 | 56 | — |
| EVA[2] | 10.0 | 7 | — | 150 |
| SIS[3] | 10.0 | 7 | — | 100 |
| SEBS[4] (30% diblock, 70% triblock) | 2.5 | 0 | 115 | — |
| | 7.5 | 0 | 36 | — |
| | 10.0 | 0 | 29[7] | 1 |
| | 10.0 | 7 | 70 | 1.3 |
| SEBS[5] 70% diblock, 30% triblock) | 2.5 | 0 | 48 | — |
| | 7.5 | 0 | 30 | 1 |

[1]STEREON 841A (43% styrene SBS copolymer, available from Firestone)
[2]LD740.16 (EVA copolmer available from EXXON)
[3]VECTOR 4411 (44% styrene SIS copolymer available from Dexco Polymers)
[4]KRATON G1657X (SEBS copolymer blend containing 30% diblock and 70% triblock, available from Shell Chemical Company)
[5]KRATON G1726X (SEBS copolymer blend containing 30% diblock and 70% triblock, available from Shell Chemical Company)
[6]average of two runs (53 and 55)
[7]average of two runs (25 and 33)

The data in Table I demonstrates that blends of the present invention utilizing SEBS as a compatibilizer exhibit significantly less die-face buildup than blends utilizing other compatibilizers. Additionally, blends of the present invention can be extruded at higher die temperatures than blends previously used in the art, allowing higher extrusion rates (i.e., production rates). Higher die temperatures also result in significant reductions of die-face buildup.

What is claimed is:

1. A deformable label suitable for attachment to a selected substrate, comprising:

a printable film facestock comprising a layer of a polymer blend which comprises:
  i) two or more incompatible polymers; and
  ii) from about 1 to about 5 percent by weight of a styrene-ethylene/butylene-styrene block copolymer said printable film facestock coated with an adhesive suitable for attaching said printable film facestock to the substrate.

2. A deformable label according to claim 1, wherein said printable film facestock further comprises a colorant.

3. A deformable label according to claim 2, wherein the colorant is titanium dioxide.

4. A deformable label according to claim 1, wherein the styrene-ethylene/butylene-styrene block copolymer is a copolymer blend of diblock and triblock.

5. A deformable label according to claim 4, wherein the copolymer blend comprises predominately triblock.

6. A deformable label according to claim 1, wherein the two or more incompatible polymers include polyethylene and polystyrene.

7. A deformable label according to claim 1, wherein the layer of a polymer blend is a surface layer.

8. A deformable label according to claim 1 wherein said printable film facestock is a monolayer film.

* * * * *